US008881115B2

(12) United States Patent
Bates et al.

(10) Patent No.: US 8,881,115 B2
(45) Date of Patent: Nov. 4, 2014

(54) COMPILING SOURCE CODE FOR DEBUGGING WITH EXPANDED SNAPSHOTS

(75) Inventors: Cary L. Bates, Rochester, MN (US); Justin K. King, Rochester, MN (US); Lee Nee, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/448,634

(22) Filed: Apr. 17, 2012

(65) Prior Publication Data
US 2013/0275948 A1     Oct. 17, 2013

(51) Int. Cl.
*G06F 9/45* (2006.01)

(52) U.S. Cl.
USPC .......................................... 717/130; 717/124

(58) Field of Classification Search
None
See application file for complete search history.

(56) References Cited

U.S. PATENT DOCUMENTS

| | | | |
|---|---|---|---|
| 4,953,084 A | 8/1990 | Meloy et al. | |
| 5,450,586 A * | 9/1995 | Kuzara et al. | 717/124 |
| 6,091,896 A | 7/2000 | Curreri et al. | |
| 6,256,777 B1 | 7/2001 | Ackerman | |
| 6,434,741 B1 | 8/2002 | Mirani et al. | |
| 6,553,565 B2 | 4/2003 | Click, Jr. et al. | |
| 6,795,963 B1 | 9/2004 | Andersen et al. | |
| 2006/0064676 A1 | 3/2006 | Chavan | |
| 2009/0144705 A1 | 6/2009 | Oda | |
| 2011/0131561 A1 | 6/2011 | Adams, III et al. | |

OTHER PUBLICATIONS

Chambers et al., "Debugging Optimized Code With Dynamic Deoptimization", Proceedings of the ACM SIGPLAN 1992 Conference on Programming Language Design and Implementation, Jul. 1992, pp. 32-43, vol. 27, Issue 7, ACM New York, NY, USA.
Bivens et al., "Debugging Optimized Code Via Tailoring", Proceedings of the 1994 ACM SIGSOFT International Symposium on Software Testing and Analysis, Aug. 1994, pp. 1-21, ACM New York, NY, USA.

* cited by examiner

*Primary Examiner* — Chuck Kendall
(74) *Attorney, Agent, or Firm* — Biggers Kennedy Lenart Spraggins, LLP

(57) ABSTRACT

Debugging source code includes: tracking, by a debugger during a debug session, duration of user examination of source code locations; providing, by the debugger to an optimizing compiler, a source code examination profile specifying source code locations examined by the user during the debug session; and receiving, by the debugger from the optimizing compiler: compiled source code for debugging, the compiled source code comprising, at each of one or more source code locations specified in the source code examination profile: a snapshot before the source code of the source code location, followed by an expanded snapshot, the expanded snapshot including computer program instructions to enable, during a debug session, examination of variable values changing during execution of the source code at the source code location; and a recording of snapshot locations and expanded snapshot locations.

20 Claims, 4 Drawing Sheets ent, a source code examination profile specifying source code locations examined by a user during a debug session; compiling, by the optimizing compiler, the source code including:

COMPILING SOURCE CODE FOR DEBUGGING WITH EXPANDED SNAPSHOTS

BACKGROUND OF THE INVENTION

1. Field of the Invention

The field of the invention is data processing, or, more specifically, methods, apparatus, and products for compiling source code for debugging and debugging such compiled source code.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computer systems evolve, software applications also evolve. Applications are increasingly more complex and computationally powerful. Such applications may be cumbersome in execution. To reduce the complexity of executing such applications, optimizing compilers are used to compile source code of an application into machine executable instructions while tuning or optimizing portions of the application. Such optimizations may be directed to minimize or maximize some attributes of the executable computer program. For example, an optimizing compiler may attempt to minimize the time needed to execute a program or to minimize the amount of memory used during execution. The optimizing compiler makes these changes by removing, rearranging, simplifying, or modifying the original source code instructions.

When an optimizing compiler compiles source code for debugging, the optimized portions of the source code are often removed from a debugger's scope given that the original source code instructions viewed by the debugger may not directly correspond to the same machine instructions generated by the optimizing compiler. That is, optimized portions of the application are generally not debuggable. To indicate to a debugger the portions of the source code which are debuggable, the optimizing compiler may insert a snapshot. A snapshot, as the term is used in this specification, is a directive and a specification of one or more variables, where the directive enables a user of a debugger to establish a breakpoint in a debug session at the location of the snapshot and to examine the specified variables when program execution reaches the snapshot location. Such snapshots, when inserted by an optimizing compiler, are inserted without any regard to a debug user's preference.

SUMMARY OF THE INVENTION

Methods, apparatus, and products for compiling source code are disclosed in this specification. Compiling source code in accordance with embodiments of present invention includes: receiving, by an optimizing compiler from a debugger, a source code examination profile specifying source code locations examined by a user during a debug session; compiling, by the optimizing compiler, the source code including: inserting, at each of one or more source code locations specified in the source code examination profile: a snapshot before source code of the source code location, followed by an expanded snapshot, the expanded snapshot including computer program instructions to enable, during a debug session, examination of variable values changing during execution of the source code at the source code location; and recording the location of each snapshot and the location of each expanded snapshot; and providing, to the debugger by the optimizing compiler, the recorded locations of each snapshot and the recorded locations of each expanded snapshot along with the compiled source code.

Methods, apparatus, and products for debugging source code are also disclosed in this specification. Debugging source code in accordance with embodiments of present invention includes: tracking, by a debugger during a debug session, duration of user examination of source code locations; providing, by the debugger to an optimizing compiler, a source code examination profile specifying source code locations examined by the user during the debug session; and receiving, by the debugger from the optimizing compiler: compiled source code for debugging, the compiled source code comprising, at each of one or more source code locations specified in the source code examination profile: a snapshot before the source code of the source code location, followed by an expanded snapshot, the expanded snapshot including computer program instructions to enable, during a debug session, examination of variable values changing during execution of the source code at the source code location; and a recording of snapshot locations and expanded snapshot locations.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
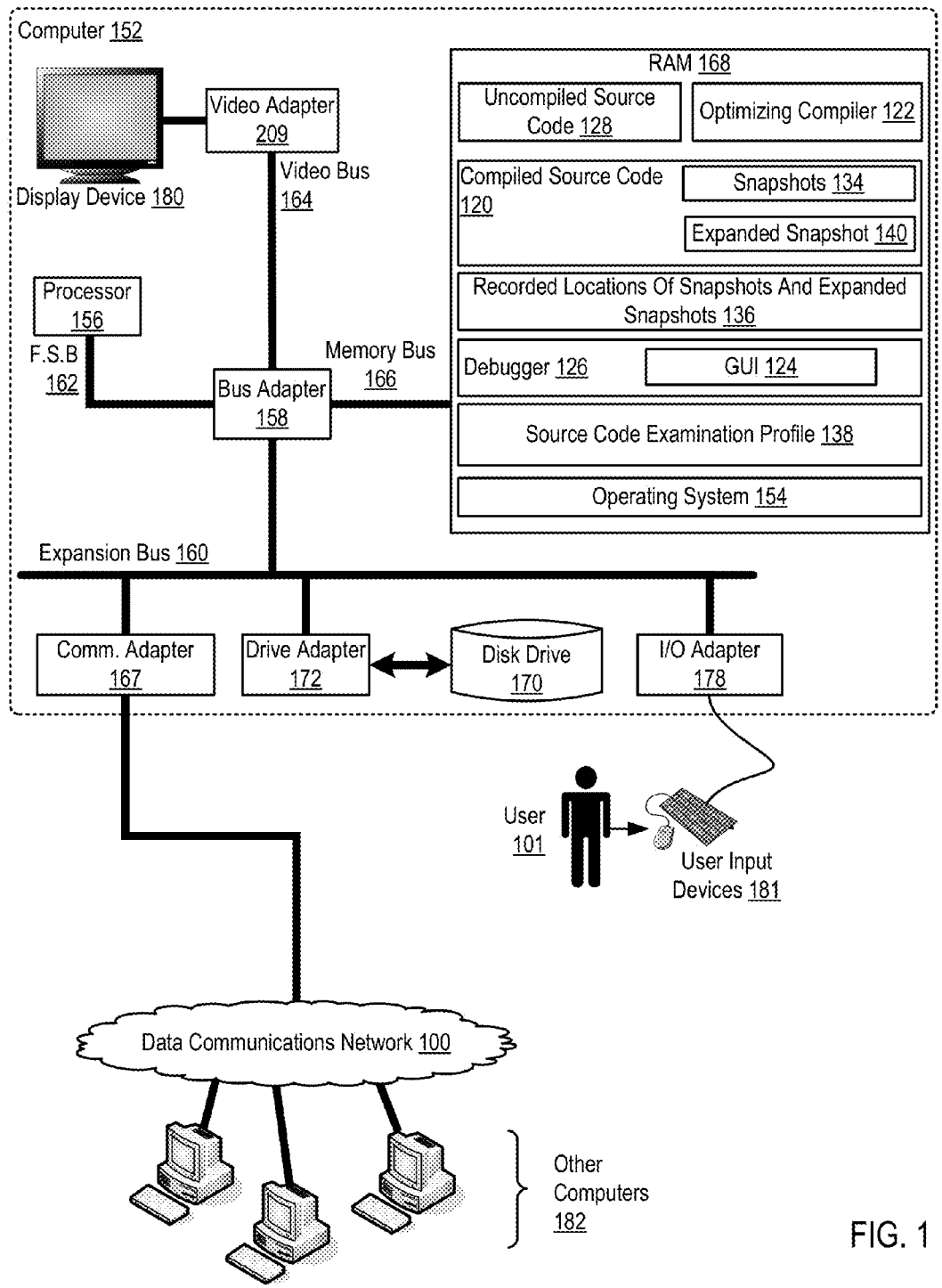
FIG. 1 sets forth a network diagram of a system for compiling source code for debugging and debugging the source code according to embodiments of the present invention.

Exemplary methods, apparatus, and products for compiling source code for debugging and debugging such source in accordance with the present invention are described with reference to the accompanying drawings, beginning with FIG. 1. FIG. 1 sets forth a network diagram of a system for compiling source code for debugging and debugging the source code according to embodiments of the present invention. The system of FIG. 1 includes automated computing machinery comprising an exemplary computer (152) useful in compiling source code for debugging and debugging such source according to embodiments of the present invention.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an optimizing compiler (122) and a debugger (126). A debugger is a computer program that is used to test and debug other programs. A compiler is a computer program or set of programs that transforms source code written in a programming language (the source language) into another computer language (the target language). The most common reason for wanting to transform source code is to create an executable program. The debugger in the example of FIG. 1 provides a graphical user interface ('GUI') (124) through which a user (101) may interact.

An optimizing compiler is a compiler that is configured to tune the output of the compiler to minimize or maximize some attributes of an executable computer program. Such optimization may include minimizing the time taken to execute a program or minimizing the amount of memory utilized by the program during program execution. The compiler can output a debuggable program that debuggable information that may describe the data type of variables or functions and correspondence between source line numbers and addresses in executable code.

The optimizing compiler (122) of FIG. 1 is configured for compiling source code in accordance with embodiments of the present invention and the debugger (126) in the example of FIG. 1 is configured for debugging source code in accordance with embodiments of the present invention.

The debugger (126) in the example of FIG. 1 is configured to track, during a debug session, duration of user (101) examination of source code locations. 'Duration of examination' may be specified in a variety of ways. For example, the duration of the examination may be specified in terms of time, in terms of a number of source code modifications at the source code location, in terms of a number of variable value modifications at the source code location, some combination of these, or in other ways as will occur to readers of skill in the art. The term 'source code location' as used in this specification may refer to a single line of source code, a predefined number of source code lines, a function call, a function, a set of lines comprising declarations, a set of lines comprising definitions, or some other portion of source code.

The debugger then provides, to the optimizing compiler (122), a source code examination profile (138) specifying source code locations examined by the user during the debug session. Upon receipt, the optimizing compiler (122) compiles the source code (128). In compiling the uncompiled source code (128) the optimizing compiler (122) inserts, at each of one or more source code locations specified in the source code examination profile: a snapshot (134) before source code of the source code location, followed by an expanded snapshot (140). The optimizing compiler (122) records (136) the location of each snapshot and the location of each expanded snapshot and provides the compiled source code along with the recorded locations (136) to the debugger.

As mentioned above, the compiler inserts a snapshot, followed by source code which is followed by an expanded snapshot. The expanded snapshot includes computer program instructions to enable, during a debug session, examination of variable values changing during execution of the source code at the source code location. Snapshots generally enable a user to insert a breakpoint at a source code location and view, and in some cases modify, various variable values. Such a breakpoint, however, is inserted at the beginning of a source code line. After encountering the breakpoint, once execution resumes, the source code at the line is executed and a variables having values changed during that execution may not be viewed. The expanded snapshot therefore enables a debugger to insert a breakpoint (at the request of a user or automatically responsive to a 'step' command) directly after the expanded snapshot which includes instructions to enable a user to examine variable values that have changed during execution of the source code line.

Also stored in RAM (168) is an operating system (154). Operating systems useful compiling source code for debugging and debugging such source according to embodiments of the present invention include UNIX™, Linux™, Microsoft XP™, AIX™, IBM's i5/OS™, and others as will occur to those of skill in the art. The operating system (154), optimizing compiler (122), uncompiled source code (128), compiled source code (120), debugger (126), recorded locations of snapshots (136), and the variable value modification profile (138) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for compiling source code for debugging and debugging such source according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for compiling source code for debugging and debugging such source according to embodiments of the present invention include modems for wired dial-up communications, Ethernet (IEEE 802.3) adapters for wired data communications, and 802.11 adapters for wireless data communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

The compiler (122) and the debugger (126) in the example of FIG. 1 are both modified in accordance with embodiments of the present invention. Although the two may be included in a single system, the two also operate separately in accordance with embodiments of the present invention. To that end, FIG. 2 sets forth a flow chart illustrating an exemplary method of compiling source code for debugging according to embodiments of the present invention while FIG. 3 is directed to actions of a debugger configured in accordance with embodiments of the present invention.

Figure 2:
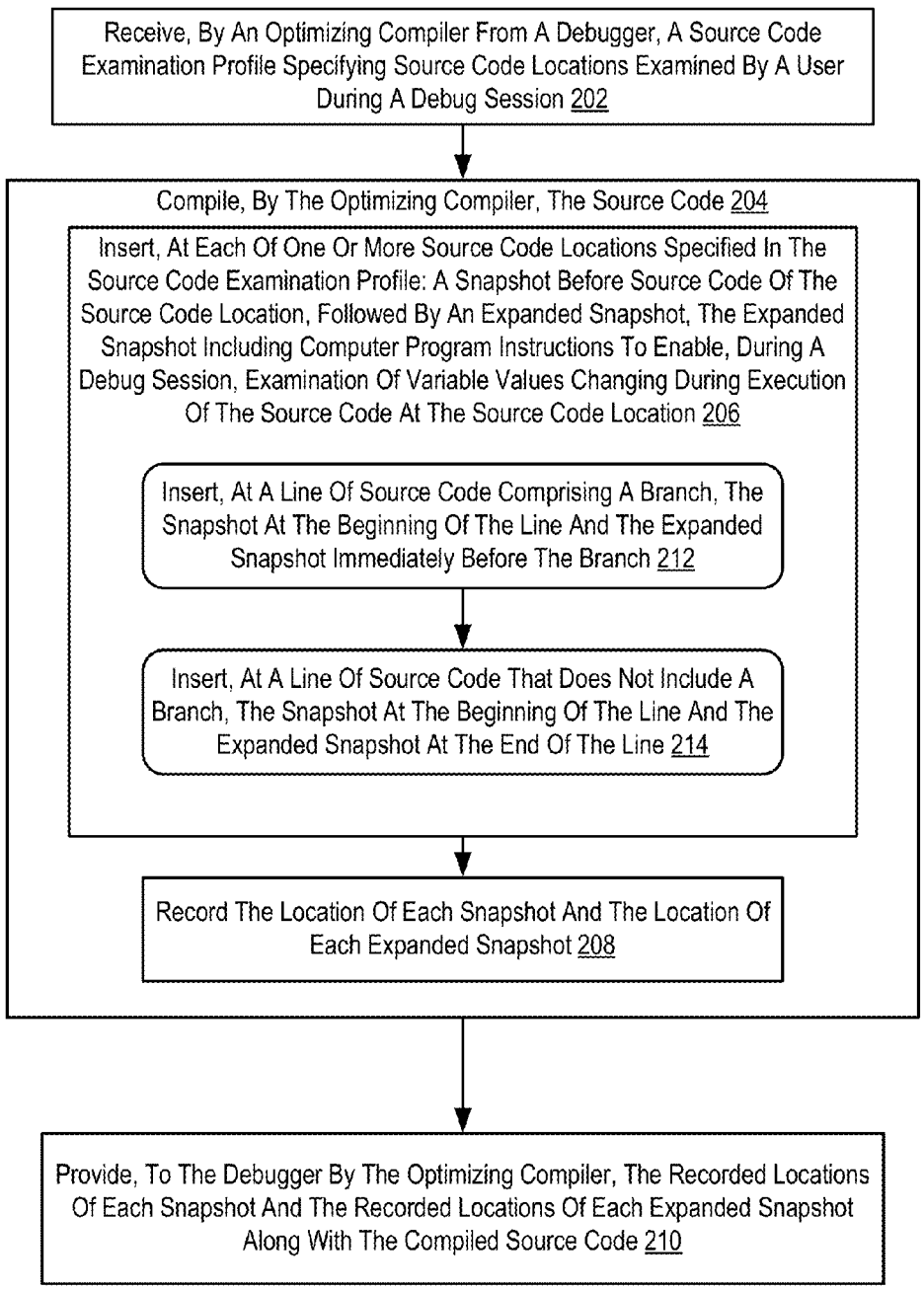
FIG. 2 sets forth a flow chart illustrating an exemplary method of compiling source code for debugging according to embodiments of the present invention FIG. 3 sets forth a flow chart illustrating an exemplary method for debugging source code in accordance with embodiments of the present invention.
Figure 3:
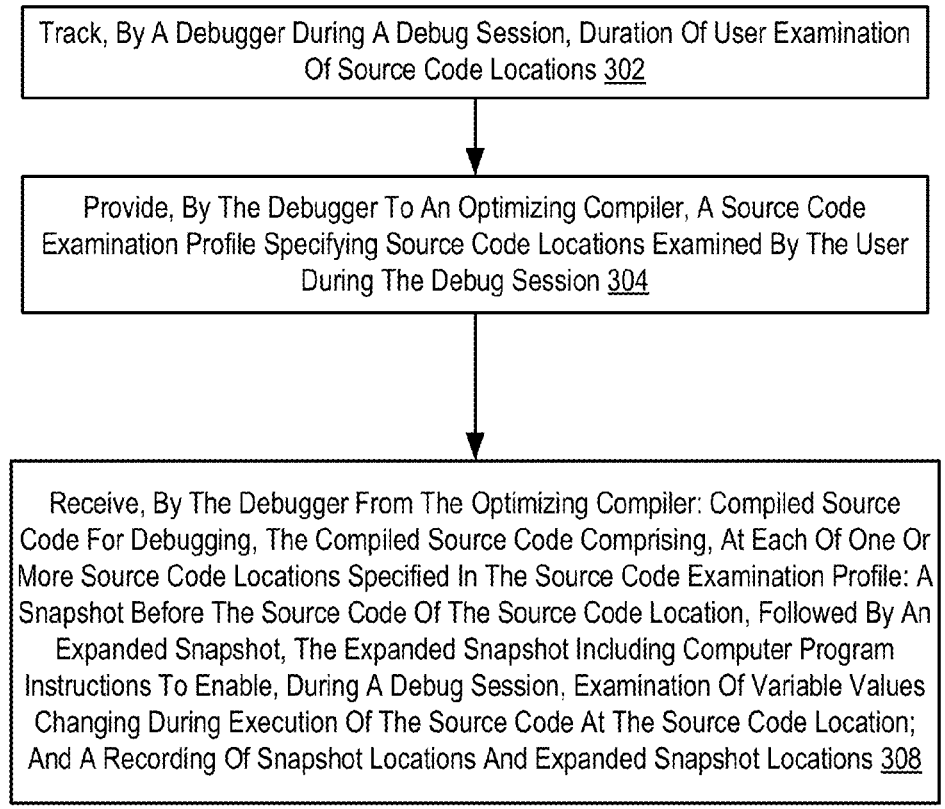

The method of FIG. 2 includes receiving (202), by an optimizing compiler from a debugger, a source code examination profile specifying source code locations examined by a user during a debug session. A source code examination profile may be implemented in a variety of ways: as a file, as a list, as a linked list, as a table, as part of an object file, and as other data structures that may occur to readers of skill in the art. Likewise, receiving (202) such a source code examination profile may be carried out in variety of ways including, for example, through a notification or message, by retrieving the profile from a predefined memory location, by loading the profile as part of a source code object file, and so on as will occur to readers of skill in the art.

The method of FIG. 2 also includes compiling (204), by the optimizing compiler, the source code. In the method of FIG. 2, compiling (204) the source code includes inserting (206), at each of one or more source code locations specified in the source code examination profile: a snapshot before source code of the source code location, followed by an expanded snapshot. The expanded snapshot includes including computer program instructions to enable, during a debug session, examination of variable values changing during execution of the source code at the source code location. In the method of FIG. 2, compiling (204) the source code also includes recording (208) the location of each snapshot and the location of each expanded snapshot.

In the method of FIG. 2 inserting (206), at each of one or more source code locations specified in the source code examination profile: a snapshot before source code of the source code location, followed by an expanded snapshot may include inserting (212), at a line of source code comprising a branch, the snapshot at the beginning of the line and the expanded snapshot immediately before the branch and inserting (214), at a line of source code that does not include a branch, the snapshot at the beginning of the line and the expanded snapshot at the end of the line.

The method of FIG. 2 also includes providing (210), to the debugger by the optimizing compiler, the recorded locations of each snapshot and the recorded locations of each expanded snapshot along with the compiled source code. The optimizing compiler may provide (210) the recorded locations and the compiled source code in various ways including, for example, storing the source code and the recorded locations of the snapshots in a memory location accessible by the debugger.

For further explanation, FIG. 3 sets forth a flow chart illustrating an exemplary method for debugging source code in accordance with embodiments of the present invention. The method of FIG. 3 includes tracking (302), by a debugger during a debug session, duration of user examination of source code locations. Tracking (302) duration of user examination of source code locations may be carried out in a variety of ways, some of which are explained below with regard to FIG. 4.

The method of FIG. 3 also includes providing (304), by the debugger to an optimizing compiler, a source code examination profile specifying source code locations examined by the user during the debug session. Providing (304) a source code examination profile specifying source code locations examined by the user during the debug session may be carried out in a variety of ways including, for example, through a notification or message, by storing the profile in a predefined memory location, by storing the profile as part of a source code object file, and so on as will occur to readers of skill in the art.

The method of FIG. 3 also includes receiving (308), by the debugger from the optimizing compiler: compiled source code for debugging, the compiled source code comprising, at each of one or more source code locations specified in the source code examination profile: a snapshot before the source code of the source code location, followed by an expanded snapshot, the expanded snapshot including computer program instructions to enable, during a debug session, examination of variable values changing during execution of the source code at the source code location; and a recording of snapshot locations and expanded snapshot locations.

Once received, the debugger may, responsive to a 'step' command, insert a breakpoint immediately after the expanded snapshot, execute the source code between the snapshot and expanded snapshot, execute the instructions of the expanded snapshot to identify variable values having been changed during the execution of the source code between the snapshot and expanded snapshot, encounter the breakpoint after the expanded snapshot (thereby halting execution) and enable a user to examine the variables having values that changed during execution.

Figure 4:
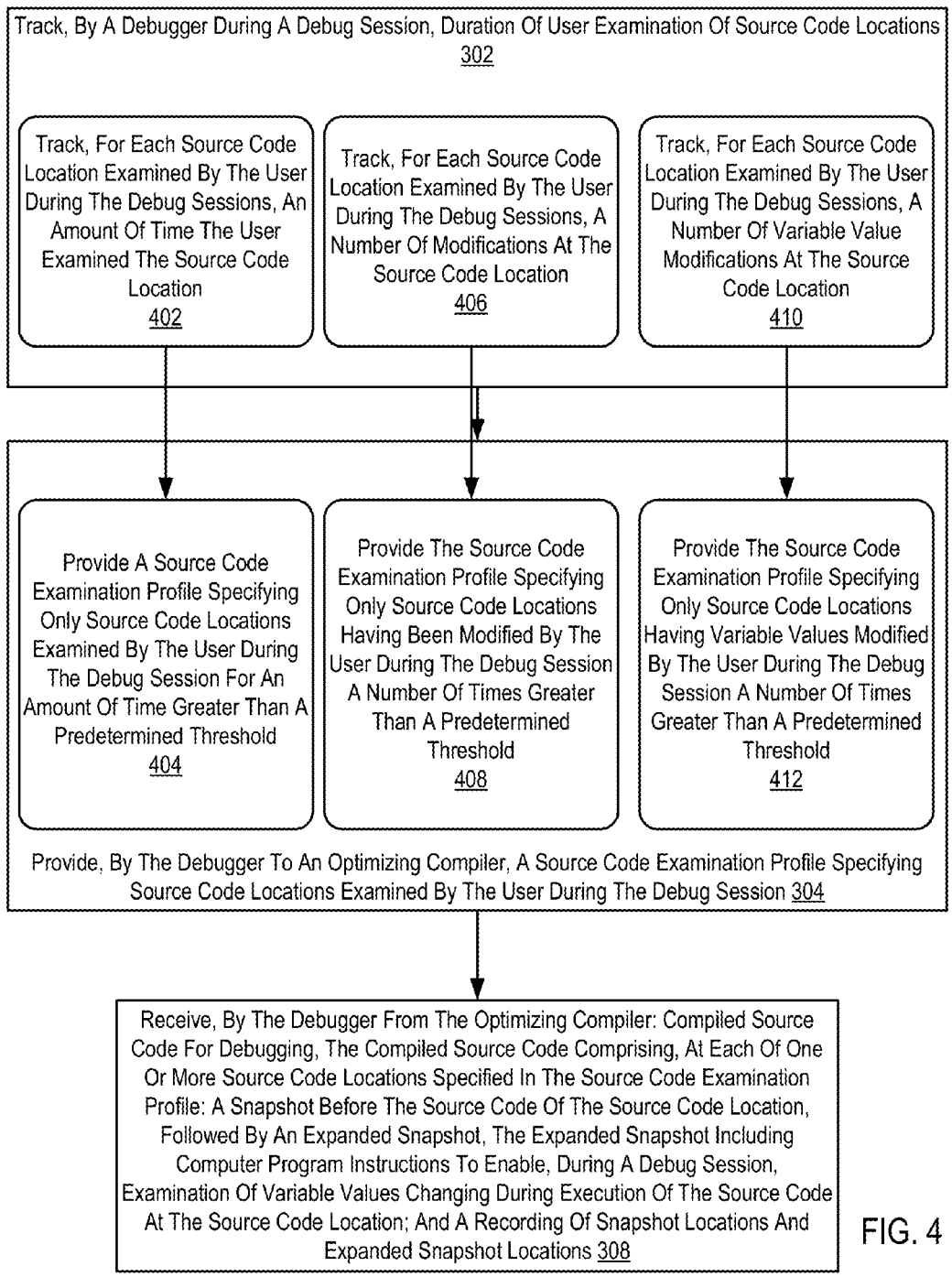
FIG. 4 sets forth a flow chart illustrating a further exemplary method for debugging source code according to embodiments of the present invention.

For further explanation, FIG. 4 sets forth a flow chart illustrating a further exemplary method for debugging source code according to embodiments of the present invention. The method of FIG. 4 is similar to the method of FIG. 3 in that the method of FIG. 4 also includes: tracking (302) duration of user examination of source code locations; providing (304) a source code examination profile to an optimizing compiler; and receiving compiled source code that includes, at each of one or more source code locations specified in the source code examination profile: a snapshot before the source code of the source code location, followed by an expanded snapshot and a recording of snapshot locations and expanded snapshot locations.

The method of FIG. 4 differs from the method of FIG. 3, however, in that the method of FIG. 4 includes three methods of tracking (302) duration of user examination of source code locations and providing (304) a source code examination profile to an optimizing compiler. Although the three methods are depicted separately readers of skill in the art will recognize than some embodiments of the present invention may include any combination of these methods.

In the method of FIG. 4, tracking (302) duration of user examination of source code locations may include tracking (402), for each source code location examined by the user during the debug sessions, an amount of time the user examined the source code location and providing (304) the source code examination profile specifying source code locations examined by the user during the debug session includes providing (404) a source code examination profile specifying only source code locations examined by the user during the debug session for an amount of time greater than a predetermined threshold.

Also in the method of FIG. 4, tracking (302) duration of user examination of source code locations may include tracking (406), for each source code location examined by the user during the debug sessions, a number of modifications at the source code location and providing (304) a source code examination profile specifying source code locations examined by the user during the debug session includes providing (408) the source code examination profile specifying only source code locations having been modified by the user during the debug session a number of times greater than a predetermined threshold.

Also in the method of FIG. 4, tracking (302) duration of user examination of source code locations may include tracking (410), for each source code location examined by the user during the debug sessions, a number of variable value modifications at the source code location and providing (304) a source code examination profile specifying source code locations examined by the user during the debug session includes providing (412) the source code examination profile specifying only source code locations having variable values modified by the user during the debug session a number of times greater than a predetermined threshold.

Each of these example methods relies on a particular parameter—amount of time, number of modifications of source code, number of variable value modifications—to indicate a duration of user examination of a source code location. Readers of skill in the art will recognize that any combination of these parameters or other parameters not described here may be utilized to generate and provide a source code examination profile specifying source locations examined by a user during a debug session.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of debugging source code, the method comprising:
    tracking, by a debugger during a debug session, duration of user examination of source code locations;
    providing, by the debugger to an optimizing compiler, a source code examination profile specifying source code locations examined by the user during the debug session; and
    receiving, by the debugger from the optimizing compiler:
        compiled source code for debugging, the compiled source code comprising, at each of one or more source code locations specified in the source code examination profile: a snapshot before the source code of the source code location, followed by an expanded snapshot, the expanded snapshot including computer program instructions to enable, during a debug session, examination of variable values changing during execution of the source code at the source code location; and
        a recording of snapshot locations and expanded snapshot locations.

2. The method of claim 1 wherein:
    each snapshot comprises a directive and a specification of one or more variables, the directive enabling the user to establish a breakpoint in a debug session at the location of the snapshot and examine the specified variables when execution reaches the snapshot location.

3. The method of claim 1 wherein
    tracking duration of user examination of source code locations further comprises tracking, for each source code location examined by the user during the debug sessions, an amount of time the user examined the source code location; and
    providing the source code examination profile specifying source code locations examined by the user during the debug session further comprises providing a source code examination profile specifying only source code locations examined by the user during the debug session for an amount of time greater than a predetermined threshold.

4. The method of claim 1 wherein:
    tracking duration of user examination of source code locations further comprises tracking, for each source code location examined by the user during the debug sessions, a number of modifications at the source code location; and
    providing a source code examination profile specifying source code locations examined by the user during the debug session further comprises providing the source code examination profile specifying only source code locations having been modified by the user during the debug session a number of times greater than a predetermined threshold.

5. The method of claim 1 wherein:
    tracking duration of user examination of source code locations further comprises tracking, for each source code location examined by the user during the debug sessions, a number of variable value modifications at the source code location; and
    providing a source code examination profile specifying source code locations examined by the user during the debug session further comprises providing the source code examination profile specifying only source code locations having variable values modified by the user during the debug session a number of times greater than a predetermined threshold.

6. An apparatus for debugging source code, the apparatus comprising a computer processor, a computer memory operatively coupled to the computer processor, the computer memory having disposed within it computer program instructions that, when executed by the computer processor, cause the apparatus to carry out the steps of:
    tracking, by a debugger during a debug session, duration of user examination of source code locations;
    providing, by the debugger to an optimizing compiler, a source code examination profile specifying source code locations examined by the user during the debug session; and
    receiving, by the debugger from the optimizing compiler:
        compiled source code for debugging, the compiled source code comprising, at each of one or more source code locations specified in the source code examination profile: a snapshot before the source code of the source code location, followed by an expanded snapshot, the expanded snapshot including computer program instructions to enable, during a debug session, examination of variable values changing during execution of the source code at the source code location; and
        a recording of snapshot locations and expanded snapshot locations.

7. The apparatus of claim 6 wherein:
    each snapshot comprises a directive and a specification of one or more variables, the directive enabling the user to establish a breakpoint in a debug session at the location of the snapshot and examine the specified variables when execution reaches the snapshot location.

8. The apparatus of claim 6 wherein
    tracking duration of user examination of source code locations further comprises tracking, for each source code location examined by the user during the debug sessions, an amount of time the user examined the source code location; and providing the source code examination profile specifying source code locations examined by the user during the debug session further comprises providing a source code examination profile specifying only source code locations examined by the user during the debug session for an amount of time greater than a predetermined threshold.

9. The apparatus of claim 6 wherein:
tracking duration of user examination of source code locations further comprises tracking, for each source code location examined by the user during the debug sessions, a number of modifications at the source code location; and
providing a source code examination profile specifying source code locations examined by the user during the debug session further comprises providing the source code examination profile specifying only source code locations having been modified by the user during the debug session a number of times greater than a predetermined threshold.

10. The apparatus of claim 6 wherein:
tracking duration of user examination of source code locations further comprises tracking, for each source code location examined by the user during the debug sessions, a number of variable value modifications at the source code location; and
providing a source code examination profile specifying source code locations examined by the user during the debug session further comprises providing the source code examination profile specifying only source code locations having variable values modified by the user during the debug session a number of times greater than a predetermined threshold.

11. A computer program product for debugging source code, the computer program product disposed upon a computer readable medium, wherein the computer readable medium is not a signal, the computer program product comprising computer program instructions that, when executed, cause a computer to carry out the steps of:
tracking, by a debugger during a debug session, duration of user examination of source code locations;
providing, by the debugger to an optimizing compiler, a source code examination profile specifying source code locations examined by the user during the debug session; and
receiving, by the debugger from the optimizing compiler:
compiled source code for debugging, the compiled source code comprising, at each of one or more source code locations specified in the source code examination profile: a snapshot before the source code of the source code location, followed by an expanded snapshot, the expanded snapshot including computer program instructions to enable, during a debug session, examination of variable values changing during execution of the source code at the source code location; and
a recording of snapshot locations and expanded snapshot locations.

12. The computer program product of claim 11 wherein:
each snapshot comprises a directive and a specification of one or more variables, the directive enabling the user to establish a breakpoint in a debug session at the location of the snapshot and examine the specified variables when execution reaches the snapshot location.

13. The computer program product of claim 11 wherein tracking duration of user examination of source code locations further comprises tracking, for each source code location examined by the user during the debug sessions, an amount of time the user examined the source code location; and
providing the source code examination profile specifying source code locations examined by the user during the debug session further comprises providing a source code examination profile specifying only source code locations examined by the user during the debug session for an amount of time greater than a predetermined threshold.

14. The computer program product of claim 11 wherein:
tracking duration of user examination of source code locations further comprises tracking, for each source code location examined by the user during the debug sessions, a number of modifications at the source code location; and
providing a source code examination profile specifying source code locations examined by the user during the debug session further comprises providing the source code examination profile specifying only source code locations having been modified by the user during the debug session a number of times greater than a predetermined threshold.

15. The computer program product of claim 11 wherein:
tracking duration of user examination of source code locations further comprises tracking, for each source code location examined by the user during the debug sessions, a number of variable value modifications at the source code location; and
providing a source code examination profile specifying source code locations examined by the user during the debug session further comprises providing the source code examination profile specifying only source code locations having variable values modified by the user during the debug session a number of times greater than a predetermined threshold.

16. The computer program product of claim 11 wherein the computer readable medium comprises a signal medium.

17. The computer program product of claim 11 wherein the computer readable medium comprises a storage medium.

18. A method of compiling source code, the method comprising:
receiving, by an optimizing compiler from a debugger, a source code examination profile specifying source code locations examined by a user during a debug session;
compiling, by the optimizing compiler, the source code including:
inserting, at each of one or more source code locations specified in the source code examination profile: a snapshot before source code of the source code location, followed by an expanded snapshot, the expanded snapshot including computer program instructions to enable, during a debug session, examination of variable values changing during execution of the source code at the source code location; and
recording the location of each snapshot and the location of each expanded snapshot; and
providing, to the debugger by the optimizing compiler, the recorded locations of each snapshot and the recorded locations of each expanded snapshot along with the compiled source code.

19. The method of claim 18, wherein inserting a snapshot followed by an expanded snapshot further comprises:
inserting, at a line of source code comprising a branch, the snapshot at the beginning of the line and the expanded snapshot immediately before the branch.

20. The method of claim 18, wherein inserting a snapshot followed by an expanded snapshot further comprises:
  inserting, at a line of source code that does not include a branch, the snapshot at the beginning of the line and the expanded snapshot at the end of the line.

* * * * *